Nov. 24, 1970 R. H. STENTZ ET AL 3,543,286

MULTI-GEOMETRIC PATTERN ELECTRIC GENERATOR

Filed April 25, 1969 5 Sheets-Sheet 1

INVENTORS.
Raymond H. Stentz
Alvin W. Bauer

BY [signature]

ATTORNEY.

MULTI-GEOMETRIC PATTERN ELECTRIC GENERATOR

Filed April 25, 1969 5 Sheets-Sheet 2

INVENTORS.
Raymond H. Stentz
Alvin W. Bauer
BY
[signature]
ATTORNEY.

MULTI-GEOMETRIC PATTERN ELECTRIC GENERATOR

Filed April 25, 1969

INVENTORS.
Raymond H. Stentz
Alvin W. Bauer
BY [signature]
ATTORNEY.

INVENTORS.
Raymond H. Stentz
Alvin W. Bauer
BY
Roland A. Anderson
ATTORNEY.

INVENTORS.
Raymond H. Stentz
Alvin W. Bauer
BY [signature]
ATTORNEY.

United States Patent Office 3,543,286

Patented Nov. 24, 1970

3,543,286
MULTI-GEOMETRIC PATTERN ELECTRIC GENERATOR

Raymond H. Stentz and Alvin W. Bauer, Cincinnati, Ohio, assignors to the United States of America as represented by the United States Atomic Energy Commission Filed Apr. 25, 1969, Ser. No. 819,290
Int. Cl. B23k *15/00*
U.S. Cl. 219—121 5 Claims

ABSTRACT OF THE DISCLOSURE

Electrical circuit apparatus is provided for X- and Y-axis component electrical signals which determine any selected one of a plurality of predetermined geometric patterns. First and second plurality of series connected resistors form voltage divider networks for obtaining predetermined X- and Y-axis coordinate voltages, respectively. Ganged function potentiometers rotate to generate the X- and Y-axis component voltages for straight-line segments of the selected geometric pattern. A plurality of ganged multiposition switches interconnect the voltage divider resistors and function potentiometers for selecting the particular geometric pattern to be generated. The selected geometric pattern may be rotated any number of degrees if desired or necessary for aligning the pattern with the workpiece without moving the workpiece, while at the same time not changing the shape of the selected pattern or the speed at which the pattern is being generated. The circuit apparatus also includes means for generating irregular shaped patterns, when needed or desired.

BACKGROUND OF THE INVENTION

The invention described herein was made in the course of, or under, a contract with the U.S. Atomic Energy Commission.

The present invention is an improvement over the system described in U.S. Patent No. 3,393,370, issued July 16, 1968. In the system of that patent, there is disclosed electrical circuitry apparatus associated with the deflection coils of electron beam devices and, in particular, to improvements in the electrical circuits which generate and amplify electrical signals for controlling the movement of an electron beam in selected patterns on a workpiece being processed thereby.

Electron beam machines, as they are now conventionally described, are devices which generate a highly focussed beam of electrons, which beam may be utilized to process a material being worked on thereby such as in welding, brazing, melting, and cutting. Electron beam machines, and in particular, electron beam welders, are operated to direct a generated electron beam at a selected point or along a selected path (pattern) on the material being processed. The direction and motion of the electron beam may be controlled by beam deflection coils. A first pair of such coils providing deflection of the beam in a first (X-axis) direction, and a second pair providing deflection in a second direction orthogonal to the first (i.e., the Y-axis direction), the X and Y axes conventionally defining a plane perpendicular to the electron beam axis.

The electrical circuit apparatus which supplies electrical control signals to the electron beam machine deflection coils includes components that may be described as a pattern generator and direct current (D.C.) power amplifier. The pattern generator provides electrical signals characteristic of the pattern to be defined by the electron beam on the material to be processed, and the D.C. amplifier amplifies the normally low-level power output of the pattern generator to a magnitude sufficient to adequately energize the deflection coils.

The improvements which the above patented system provided over the prior art included electrical circuit apparatus for automatically controlling the motion of an electron beam in a selected and desired geometric pattern, means for controlling the speed of generation of the pattern including stopping and reversal of direction, providing a direct current power amplifier having a relatively high power output with a flat response over a desired operating frequency range with the amplifier including means to correct for nonlinearity in electron beam machine deflection coils, and providing a puddling circuit in the pattern generator wherein a puddling action can be made variable and controlled in size and also providing amplitude modulation of the puddling action. The above patented system also included means for shifting the selected pattern by 90° when desired by the use of a two-position phase shift switch.

The system of the above-mentioned patent was designed and is used to weld regular shapes such as a circle, square, triangle, etc. However, sometimes it is desirable to be able to weld irregular shapes such as may be required to repair a crack in a casting, or to be able, when the need arises, to repeatedly generate irregular shaped patterns, as, for example, when welding air foil shapes in the aircraft industry. In addition, there exists a need for the ability to orient a pattern at any angle from 0° to 360° as needed or desired rather than utilizing the 90° phase shift of the pattern as is done in the above patented system.

The present invention was conceived to meet the above-mentioned needs and constitutes an improvement over the prior patented system which has been modified to incorporate the necessary changes and additional circuitry to accomplish the above desired functions in a manner to be described below.

SUMMARY OF THE INVENTION

It is the object of the present invention to provide a multigeometric pattern electric generator for automatically controlling the motion of an electron beam in a desired geometric pattern, wherein a selected pattern may be rotated any number of degrees, when necessary, for aligning the pattern with a workpiece to be processed by the output of the generator, and to provide the generator with means for generating irregular shaped patterns when needed or desired.

The above object has been accomplished in the present invention by replacing the 0°–90° phase switch of the above-mentioned patent with a rotation control circuit to permit rotation or orientation of the generated pattern at any angle from 0° to 360°, and by adding a four-section, three position, ganged selector switch such that the deflection coils of an electron beam welder may selectively be connected to the pattern generator through the rotation control circuit and a power amplifier, be connected to a Data-Trak circuit through the rotation control circuit and the power amplifier, and be connected directly to a Tracer circuit through the power amplifier, wherein the electron beam welder can be selectively operated to effect welding of regular patterns, irregular patterns of a repetitive nature, or isolated irregular patterns, in a manner to be described hereinbelow.

BRIEF DESCRIPTION OF THE INVENTION

DESCRIPTION OF THE PREFERRED EMBODIMENT

Figures 1, 2:
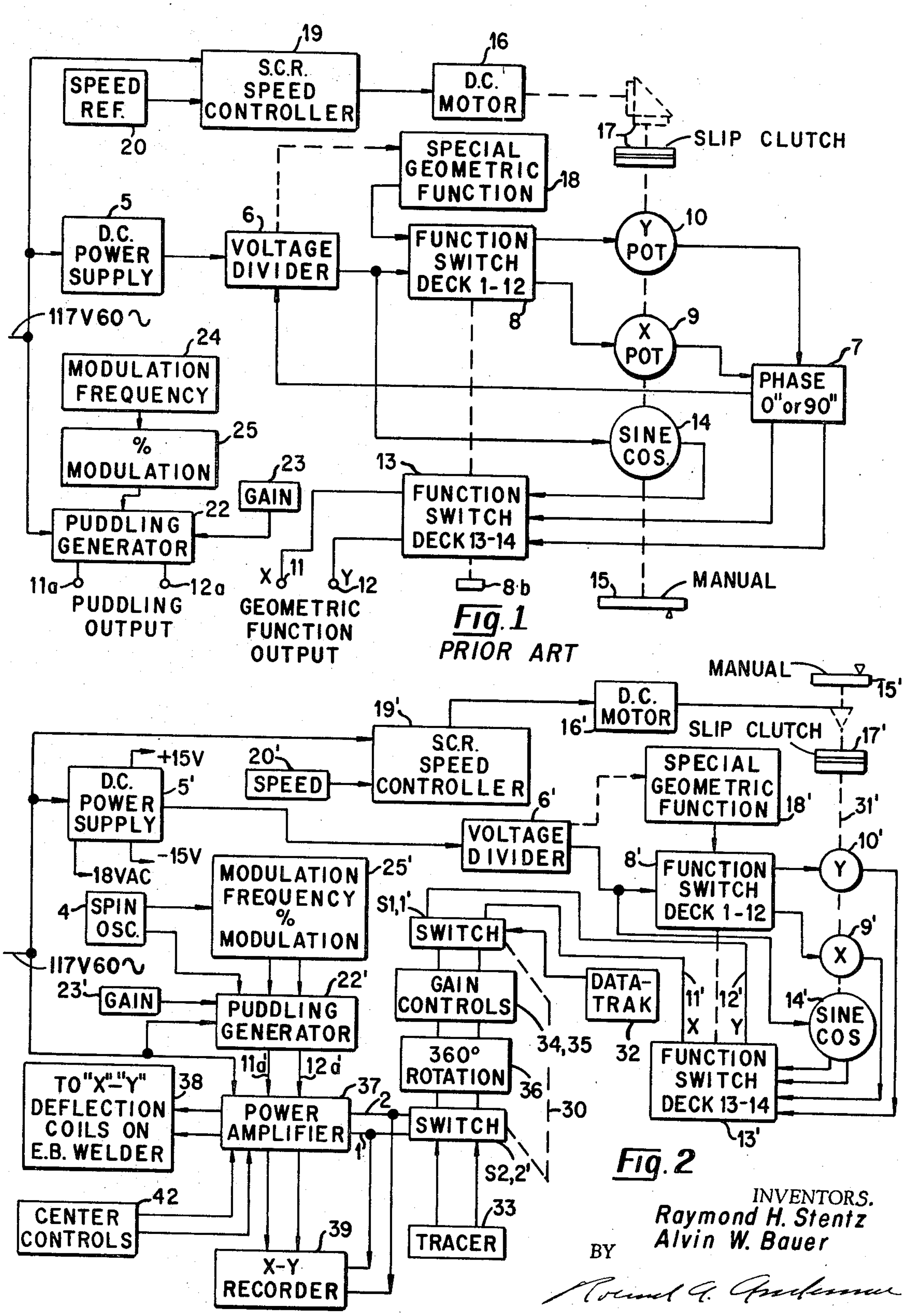
Fig. 1 PRIOR ART, Fig. 2
FIG. 1 is a block diagram of the pattern generator and associated puddling circuit of the above prior art patent.
FIG. 2 is a block diagram of the pattern generator and associated puddling circuit, rotation control circuit, Data-Trak circuit, and Tracer circuit of the present invention.

In FIG. 1 there is shown a block diagram of the "Multi-Geometric Pattern Electric Generator" of the above-mentioned prior Pat. No. 3,393,370, to A. W. Bauer, issued July 16, 1968. For an understanding of the detailed operation of the above prior system, a major portion of which is common to the operation of the present system, reference is made to that patent. However, in order to provide a general understanding of the operation of the prior system, including the dual D.C. power amplifier of FIG. 3 of the present application which is utilized in both systems, the following general functional description will provide a background for the present application.

Briefly stated, and in accordance with the prior invention, there is provided an electrical circuit apparatus for generating X- and Y-axis component electrical signals which determine any selected one of a plurality of predetermined geometric patterns. The apparatus includes a regulated direct current power supply across which are connected a first and second plurality of series connected resistors to form voltage divider networks for obtaining predetermined X- and Y-axis coordinate voltages, respectively. A three-gang multitap function potentiometer which may be automatically rotated in either direction at selected speeds generates the X- and Y-axis component voltages required to produce a selected geometric pattern. A first of the multitap function potentiometers provides as an output the X-axis component voltage, and the second potentiometer provides the Y-axis component voltage for a selected straight-line segmented geometric pattern. The third function potentiometer comprises a sine-cosine potentiometer which provides X- and Y-axis component voltages for generating a circular pattern. The number of taps on the first and second function potentiometers determine the maximum number sided figure that may be generated. A plurality of ganged multiposition switches are operated for selecting the particular geometric pattern to be generated. The multiposition switches interconnect the voltage divider resistors and the function potentiometers to supply the coordinate voltages selected from the voltage divider network to appropriate taps of the associated function potentiometers whereupon rotation thereof generates the X- and Y-axis component voltages defining the selected geometric pattern as determined by the position setting of the multiposition switches.

For welding purposes, a circuit associated with the pattern generator provides electrical signals that cause controlled small excursions of an electron beam from the path determining a selected welding pattern. This latter "puddling" circuit obtains sine-cosine functions of an alternating current voltage which are combined in a dual D.C. power amplifier circuit with the X- and Y-axis component voltages of the geometric pattern. The resultant pattern produced by the pattern generator and puddling circuit is the selected geometric pattern modified by very small excursions therefrom, the excursions comprising a circular motion superimposed on the motion defining the selected pattern. The amplitude (diameter of puddling circle) of the puddling output can be varied by a gain control and the puddling output can also be amplitude modulated (to dilate and contract the puddling circle) over a selected frequency range at any desired percent of modulation by means of a multivibrator oscillator.

A dual power amplifier is coupled to the X- and Y-axis outputs of the pattern generator and puddling circuit. The amplifier combines and amplifies such signals for utilization thereof by the deflection coils of an electron beam machine. The amplifier is provided with a circuit for correcting nonlinearity common to many electron beam deflection coils and provides a relatively high power output with a flat response over the frequency operating range of the pattern generator.

Figure 3:
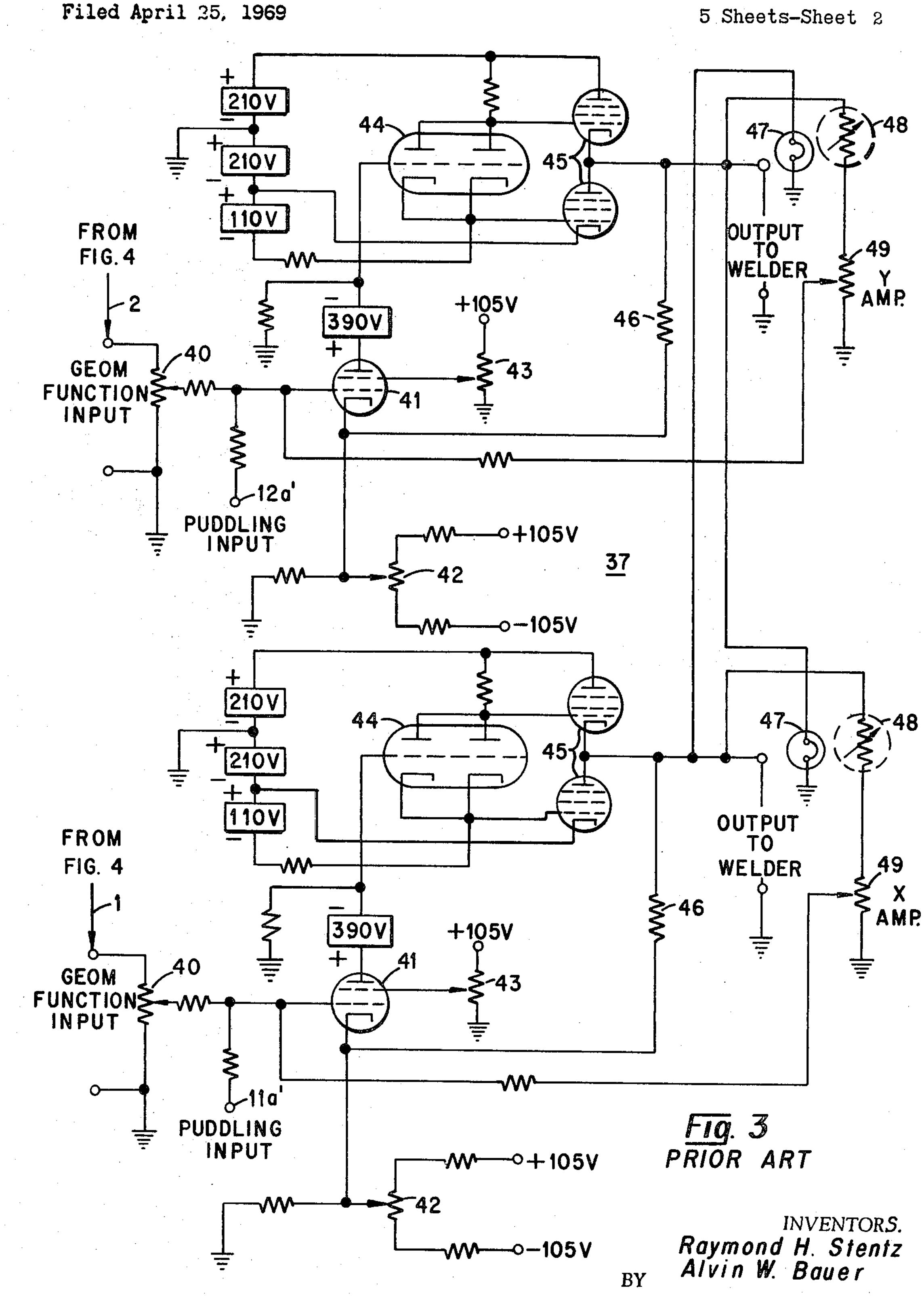
Fig. 3 PRIOR ART
FIG. 3 is a simplified schematic diagram of a dual D.C. power amplifier which was utilized in the above prior art patent and is also utilized in the present invention.

The dual D.C. power amplifier of the prior patent is shown in FIG. 3 of the present application. The amplifier of FIG. 3 is also utilized in the present invention in the manner to be described hereinbelow.

Figure 6:
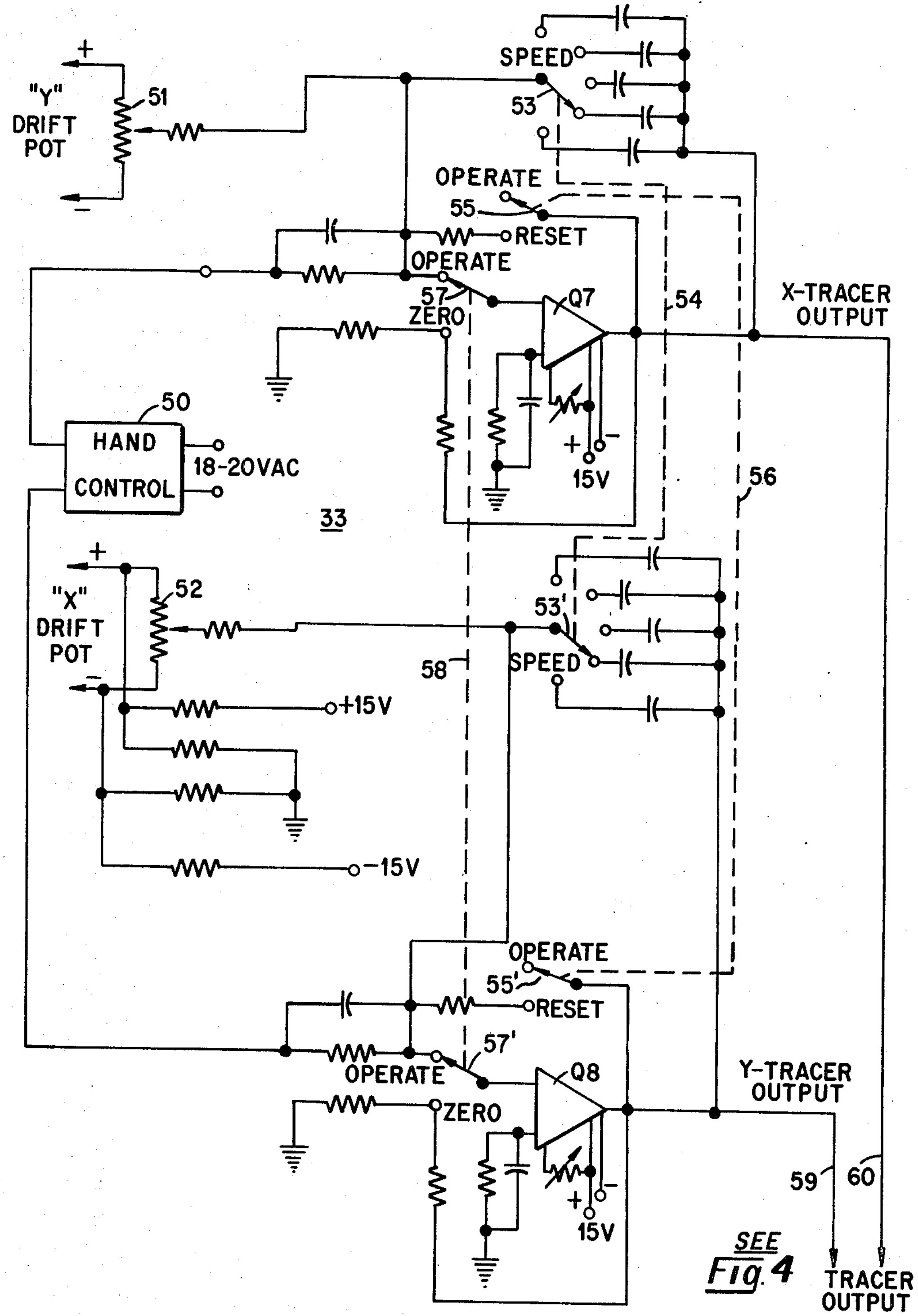
FIG. 6 is a schematic diagram of the Tracer circuit for effecting a welding operation of irregular patterns.

The present invention, as mentioned above, is an improvement over the prior patented system and FIG. 2 illustrates in block diagram form the over-all system of the present invention. The improvements consist essentially of substituting a 360° rotation control circuit 36 for the phase shift circuit 7 of FIG. 1 and connecting the output of the function switch 13′, deck 13–14, of FIG. 2 to the rotation control circuit 36 by means of switches S1, S1′, and the output of circuit 36 to the power amplifier 37 by means of switches S2, S2′, in a manner to be described below in connection with FIG. 4. In addition, the improvements further include providing the switches S1, S1′, S2, S2′ with additional contacts such as to permit selectively connecting, as desired, the output of function switch 13, deck 13–14, to the amplifier 37 in the manner indicated above, connect the output of a Data-Trak circuit 32 to the amplifier 37 through the rotation control circuit 36, or connect the output of a Tracer circuit 33 directly to the amplifier 37 in a manner to be described below for FIG. 4. The details of the Tracer circuit 33 are illustrated in FIG. 6, the Data-Trak 32 is broadly illustrated in FIG. 4, and the rotation control circuit 36 is shown in detail in FIG. 4.

Figure 5:
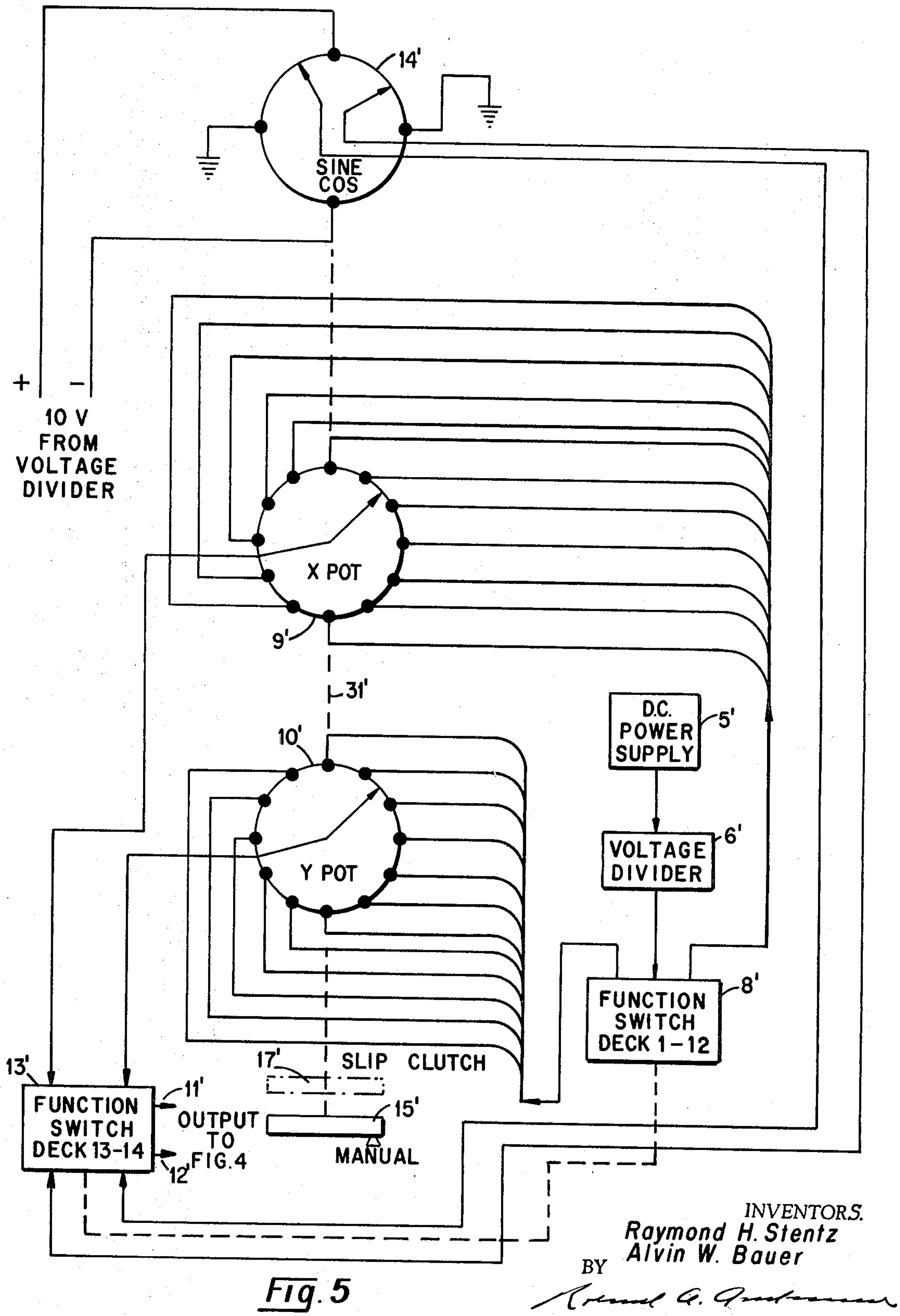
FIG. 5 is a schematic diagram of part of the regular pattern generator circuit.

It should be understood that the details and operation functions of the units 5′, 6′, 15′, 16′, 17′, 18′, 19′, 20′, 22′, 23′, 25′ of FIG. 2 and the power amplifier 37 of FIG. 2 and FIG. 3 are identical to those of corresponding units of the prior patented system, to which reference is made. The details of units 9′, 10′, and 14′, and their relationship to function switch 8′, deck 1–12, and to function switch 13′, deck 13–14, are illustrated in FIG. 5 to be described below. The details of the function switch 8′, deck 1–12, and the function switch 13′, deck 13–14, and their connections to the voltage divider 6′, are essentially the same as the corresponding units in the prior patented system, except the phase shift switch 7 of the prior system has been deleted, such that the outputs of the units 9′ and 10′ are connected directly to the function switch 13′, deck 13–14, instead of through a section of the switch 7 as was done in the prior patent. Also, the X-axis series connected resistors of the voltage divider network of the prior patent are now connected directly to the D.C. power supply 5′ in FIG. 2 of the present system and not through a section of the polarity reversing switch 7 as was done in the prior patent. The connections between the X-axis and Y-axis series connected resistors and the function switch 8′, deck 1–12, are identical to those of corresponding units of the prior patent.

The relationship between the function switch 8′ and the function switch 13′ to the units 9′, 10′, and 14′ is more clearly illustrated in FIG. 5. It should be understood that the connections between the 12 wafer switches of function switch 8′ and the units 9′ and 10′ are the same as for the corresponding units of the prior patent, and the connections between the units 9′ and 10′, and the 2 wafer switches of function switch 13′ are the same as the corresponding units of the prior patent except that they are directly connected in FIG. 5 and not by way of a section of a phase shift switch as mentioned above. The output leads 11′ and 12′ from the function switch 13′ are connected to the rotation control circuit of FIG. 4, to be described below, instead of to the power amplifier as was done in the prior patent.

The Y-axis series connected resistors of the voltage divider 6′ provide voltages representing predetermined positive and negative Y-axis coordinate voltages, and the X-axis series connected resistors of the unit 6′ provide the X-axis coordinate voltages. Tap points of the voltage divider network 6′ are connected to selected contacts of the function switch 8′, a plurality (decks 1–12) of ganged multiposition wafer switches, in the same manner as in the prior patent wherein each position supplies predetermined ones of the X- and Y-axis coordinate voltages to particular tap points of the ganged linear X-axis and Y-axis function potentiometers 9′ and 19′, respectively. Each position of function switch 8′ thus supplies all of the coordinate voltages for a particular geometric pattern to be generated, the switch being manually operable for selection of the particular desired pattern. The X- and Y-function potentiometers 9′ and 10′ are provided with equally spaced-apart tap points, see FIG. 5, such that rotation of the ganged function potentiometers generates sequentially the voltages representing X- and Y-axis component voltages to obtain sequential straight-line segments of the selected geometric pattern. The length of each straight-line segment voltage component is directly proportional to the electric potential existing between adjacent potentiometer tap points having voltages supplied thereto.

The outputs of units 9′ and 10′ are connected to the output leads 11′ and 12′ through the output function switch 13′ (decks 13, 14), ganged with function switch 8′. The X- and Y-function potentiometers 9′, 10′ are employed to generate noncircular (i.e., straight-line segmented) geometric patterns such as an equilateral triangle, hexagon, square, or rectangle with sides having a length ratio of 1:2 or 1:5. Function switch 8′ is also provided with a position marked "Special," the same as in the prior patent, for generating noncircular (straight-line segmented) geometric patterns other than those hereinbefore described. The circuit 18′ provides the necessary coordinate voltages for developing the X- and Y-axis component voltages associated with the special pattern in the same manner as in the prior patent. A circular geometric pattern is obtained by manually operating ganged function switches 8′, 13′ into a selected position wherein the output of the sine-cosine function potentiometer 14′ is connected to output leads 11′, 12′ by means of the output function switch 13′.

The manner in which the units 9′, 10′, and 14′ are rotated either manually or automatically, and the operation of the puddling circuitry 22′, 23′, and 25′ are the same as for the corresponding units in the prior patent, to which reference is made.

Figure 4:
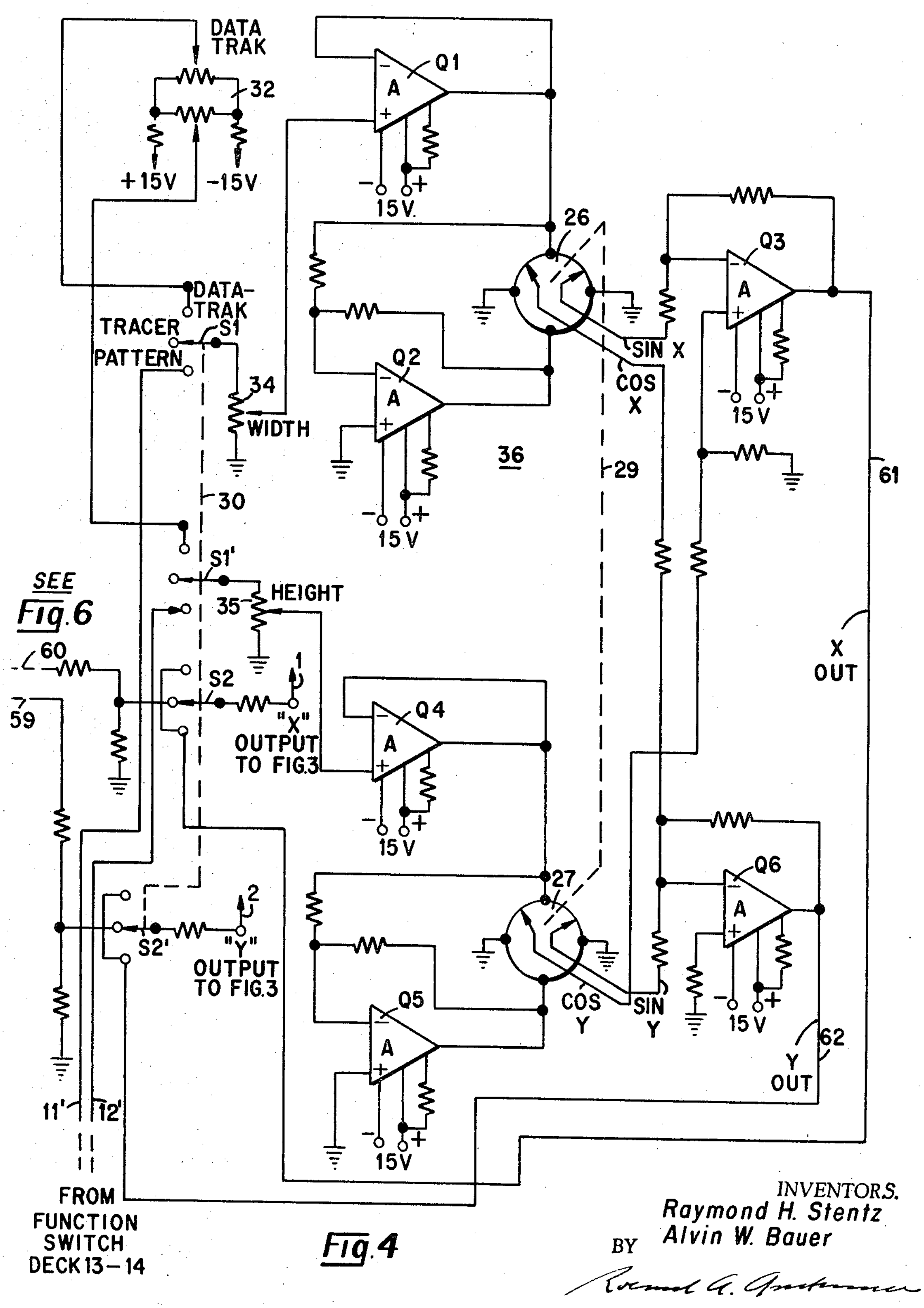
FIG. 4 is a schematic diagram of the 0° to 360° ro- above-mentioned three-position, ganged selector switch.

In order to rotate the selected pattern, as generated in the above-described manner, through any desired angle from 0° to 360° rather than shift the pattern 90° as in the prior patent, the following modification to the prior patent to accomplish such a desired pattern rotation (0° to 360°) will now be described. As mentioned above, the output leads 11′ and 12′ from the function switch 13′ are connected to the rotation control circuit of FIG. 4 in the following manner. In FIG. 4, there are provided selector switches S1, S1′ and S2, S2′ which are ganged by a mechanical coupling 30. Each of the switches S1, S1′, S2, S2′ is provided with a lower contact, a middle contact, and an upper contact, as shown. The upper position of these switches is the Data-Trak position wherein a Data-Trak circuit 32 is connected through the upper contacts of switches S1, S1′ to the rotation control circuit 36, and the output of the circuit 36 is connected by leads 61 and 62, the upper contacts of switches S2, S2′ to the output leads 1, 2, respectively, which are connected to the power amplifier 37 of FIG. 3. The purpose of the Data-Trak circuit will be described hereinbelow. The middle position of the switches S1, S1′, S2, S2′ is the Tracer position wherein the circuit 36 is by-passed or open-circuited by switches S1, S1′, and a Tracer circuit 33, as shown in FIG. 6, is directly connected by leads 59 and 60 to the output leads 2 and 1, respectively, leading to the power amplifier 37 of FIG. 3 by the switches S2, S2′ in their middle position. The purpose of the Tracer circuit 33 will be described below. The lower position of the switches S1, S1′, S2, S2′ is the Pattern position, wherein the leads 11′ and 12′ from the regular pattern generator circuit, described hereinabove, are connected to the rotation control circuit 36 by means of the lower contacts of switches S1, S1′, and the output of circuit 36 is connected by leads 61, 62, the lower contacts of switches S2, S2′ to the output leads 1, 2 leading to the amplifier of FIG. 3. Thus, it can be seen that the ganged switches S1, S1′, S2, S2′ are adapted to selectively connect, as desired, the output leads 1, 2 to the Data-Trak circuit 32 through the rotation control circuit 36, directly to the Tracer circuit leads 59, 60 and to the regular geometric pattern generator laeds 11′, 12′ through the rotation control circuit 36.

When the circuit of FIG. 4 is connected to the pattern generator leads 11′, 12′ as set forth above, the whole selected input pattern can be revolved any number of degrees, as required, without the necessity for moving the part to be welded such that the pattern can be oriented to coincide with the part to be welded which is desirable since it is sometimes hard to mechanically align the workpiece with the electrical deflection coils of the electron beam welder.

As shown in FIG. 4, the switch S1 is connected to a gain control potentiometer 34 (width) which in turn is connected to a D.C. amplifier Q1. The output of amplifier Q1 is connected to a D.C. amplifier Q2 and to a sine-cosine potentiometer 26. Amplifier Q2 is also connected at its output to potentiometer 26. The switch S1′ is connected to a gain control potentiometer 35 (height) which in turn is connected to a D.C. amplifier Q4. The output of amplifier Q4 is connected to a sine-cosine potentiometer 27 and to a D.C. amplifier Q5 whose output is also connected to the potentiometer 27. The outputs of sine-cosine potentiometers 26, 27 are cross connected to the D.C. amplifiers Q3 and Q6, as shown. Potentiometers 26 and 27 are ganged together by a mechanical coupling 29 such that they can be rotated together any number of desired or required degrees. The outputs of amplifiers Q3 and Q6 are connected by leads 61 and 62, respectively, to the output leads 1, 2, respectively, by the upper or lower positions of switches S2, S2′ as described above.

In the prior patented device, it was possible to move the pattern along the X and Y directions (translation) and to revolve or rotate the pattern exactly 90°. The translation feature has not been changed in the present invention, but the 90° rotation feature of the prior patent has been replaced by the rotation control circuit 36 of the present invention as set forth hereinabove. This means that it is now very simple to correct for any degree of misalignment between the selected pattern and the piece to be welded. It should be emphasized that the circuit FIG. 4 does not change the shape of the selected pattern or the speed at which the pattern is being generated. It merely revolves the complete pattern the same number of degrees that an operator turns a knob, not shown, coupled to the coupling 29 and which is mounted on the front panel, not shown, of the pattern generator. By visually inspecting the alignment between the pattern and the workpiece, the operator can cause them to coincide exactly.

The operation of the pattern rotation circut can be explained in the following manner. In order to position the beam in an electron beam welder 38, connected to the output of the dual amplifier 37, to a specific location, it is necessary to generate X and Y voltages which correspond to the coordinates of that point. The axes of this coordinate system (cartesian) are established by the orientation of the deflection coils. It is possible to show that the following trigonometric relations are true in a cartesian coordinate system:

$$X_1 = X \cos \theta - Y \sin \theta$$

$$Y_1 = Y \cos \theta + X \sin \theta$$

where $X_1$ and $Y_1$ are the coordinates of a point which has been revolved $\theta$ degrees from its original position at (X, Y).

The pattern rotation circuit 36 of FIG. 4 simply solves these equations and establishes the new position ($X_1$, $Y_1$). X and Y are the instantaneous voltages applied to the dual gang, sine/cosine potentiometers 26, 27 of the circuit 36, and $\theta$ is the rotation, in degrees from the zero position, of the sliders of the sine/cosine potentiometers 26, 27, The addition and subtraction required to solve the equations is performed by the D.C. amplifiers Q3 and Q6 of the rotation control circuit 36, The above explanation, in effect, shows how one point, at one instant of time, can be rotated, and it should be evident that the circuit 36 has the over-all effect of rotating the complete welding pattern since it is composed of a locus of points generated during a specific time interval.

As mentioned hereinabove, when it is desirable to repeatedly generate irregular shaped patterns, as for example, when welding air foil shapes in the aircraft industry, than the Data-Trak circuit 32 of FIG. 4 is switched the circuit by means of the upper contacts of switches S1, S1′, in which case the regular pattern generator input over leads 11′ and 12′ is switched out of the circuit. The unit 32 is shown only broadly in schematic form in FIG. 4. The Data-Trak programmer 32 may be, for example, Model 5110–2P Solid State Coordinate Programmer and is manufactured by Research, Inc., R. I. Controls Division, Minneapolis, Minn 55424. If an air foil shape or any other desired irregular shape is programmed onto the coordinate programmer 32, it will, through the action of the power amplifier and the electron beam welder's deflection coils, cause the welding beam to move and generate the same shape each time the programmer drug revolves through 360°. The Data-Trak input is also connected to the amplifier input leads 1, 2 through the rotation control circuit 36 of FIG. 4, as mentioned hereinabove, such that the irregular shaped pattern, as programmed by the unit 32, may also be rotated by the circuit 36 to align the irregular shaped pattern with the workpiece to be welded without the necessity of moving the workpiece.

Another feature of the present invention will now be described. Sometimes it is needed or desired to weld an irregular shape such as may be required to repair a crack in a casting, for example. This is accomplished in the present invention by utilizing a Tracer circuit in the following manner. As shown in FIG. 4, the middle position of switches S1, S1′, S2, S2′ connects the Tracer circuit of FIG. 6 over leads 59 and 60 directly to the leads 2 and 1, respectively, leading to the power amplifier of FIG. 3, and the Data-Trak circuit 32 and the input from the regular pattern generator over leads 11′ and 12′ are disconnected from the circuit.

The Tracer circuit 33 of FIG. 6 includes a hand control 50, a Y drift potentiometer 51, an X drift potentiometer 52, a Y voltage integrator circuit including an amplifier Q7 and a speed control switch 53, and a X voltage integrator circuit including an amplifier Q8 and a speed control switch 53′. The switches 53, 53′ are ganged together by a coupling 54. A pair of switches 57, 57′ are ganged together by a coupling 58 and have an operate position and a zero position. In the operate position of switches 57, 57′, the potentiometers 51, 52 are respectively coupled to the amplifiers Q7, Q8. A pair of reset switches 55, 55′, ganged by a coupling 56, are provided for resetting the circuit 33 prior to each new welding operation. The X-Tracer output from amplifier Q7 and the Y-Tracer output from amplifier Q8 are fed over leads 60, 59, respectively, to the middle contacts of switches S2, S2′ of FIG. 4, as mentioned hereinabove.

The hand control 50 of FIG. 6 is made by Measurements Systems, Inc., 523 West Street, Norwalk, Conn., as their Model No. 435, D.C. hand control. This hand control 50, when used by an operator in applying a force to the hand control lever, not shown, produces X- and Y-axis voltages which are proportional to the force on the lever. These voltages are fed to the abovementioned electrical integrators which produce signals representing the time integrals of the applied force. These signals, over leads 60, 59, respectively, to FIG. 4, are in turn applied by way of switches S2, S2′, in their middle position, to the leads 1 and 2 leading to the power amplifier of FIG. 3, and then to the X and Y deflection coils of the electron beam welder 38 of FIG. 2, thereby causing the electron beam to move. It can be seen that the operator can now move or steer the welding beam by applying a force on the tracer lever of the hand control 50 of FIG. 6. When the the force on the level is removed, the beam will no longer move since beam velocity is proportional to the force on the lever.

An X–Y recorder 39, FIG. 2, is used to trace the same patterns that the X and Y deflection coils of the welder 38 produce. This recorder 39 may be a Mosley Model No. 7035B made by Hewlett-Packard, Palo Alto, Calif., for example.

When the Tracer circuit 33 is used, it is sometimes difficult to see the seam or crack to be welded due to the bright light from the welding operation; therefore, the operator may trace the weld seam or crack by means of Tracer circuit at very low welding power. This will also give a trace on the X–Y recorder 39 which will be the trace or shape of the weld to be made. Now, the welding operator may turn up the power on the welder to give the desired weld while using the Tracer to follow the X–Y trace now on the recorder 39. It is, therefore, possible to weld a fine crack or seam without the visual problems caused by the bright welding beam.

As mentioned hereinabove, the output leads 1 and 2 of FIG. 4 are fed as two inputs to the dual D.C. power amplifier 37 of FIG. 3. The two puddling inputs to the amplifier 37 of FIG. 3 are by way of input terminals **11*a*′ and 12*a*′**. The operation of the puddling circuitry, FIG. 2, is the same as described in the prior patent to which reference is made. The amplifier of FIG. 3 operates in the same manner for the present invention as it does for the prior patented system and, for an understanding of such operation, reference is made to the prior patent.

The respective X and Y outputs of the amplifier 37 are connected to the X–Y deflection coils of the electron beam welder. The welder will then weld the desired pattern as selected by the selector switches S1, S1′, S2, S2′ of FIG. 4, which may be a pattern from the regular pattern generator as modified by the rotation control circuit 36 of FIG. 4 as needed, a pattern from the Data-Trak unit 32 as modified by the control circuit 36 as needed, or a pattern directly from the Tracer circuit 33, in a manner as described hereinabove.

It should now be clear from the above detailed description of the present invention that there is provided a unique welding system wherein the regular patterns can be rotated any number of selected degrees from 0° to 360° so as to align the selected regular welding pattern with the workpiece to be welded without the necessity of moving the workpiece, wherein the system is adapted to perform the welding of irregular shaped patterns of a repetitive nature by the selective use of a Data-Trak Programmer, in conjunction with the rotation control feature when needed, and wherein the system is adapted to perform the welding of an isolated irregular shaped pattern by the selective use of a Tracer circuit.

This invention has been described by way of illustration rather than by way of limitation and it should be apparent that it is equally applicable in fields other than those described.

What is claimed is:

1. In a multi-geometric pattern electric generator and welding system comprising means for generating a predetermined selected geometric pattern represented by selected X- and Y-axis component voltages, said pattern selected from the group consisting essentially of straight-line segmented geometric patterns, a circular pattern, and special straight-line segmented geometric patterns; a dual D.C. power amplifier; an electron beam welder having X–Y deflection coils for positioning the electron beam of said welder during a welding operation; a modulated puddling circuit; means for connecting the output of said puddling circuit as respective first inputs to said dual power amplifier; means for connecting said selected X- and Y-axis component voltages from said pattern generator as respective second inputs to said dual power amplifier; and means for connecting the respective X- and Y-axis outputs of said dual power amplifier to said X–Y deflection coils of said welder to effect the desired welding by the electron beam of said welder of a workpiece in accordance with the selected pattern; the improvement comprising a pattern rotation control circuit having respective X and Y channels and connected to said selected X- and Y-axis component voltages representing a selected pattern from said pattern generator, and connecting the respective outputs of said control circuit to said respective second inputs to said dual power amplifier, said pattern rotation control circuit being adapted to rotate said selected pattern any desired number of degrees from 0° to 360° to effect the orientation of the selected pattern with said workpiece.

2. The system set forth in claim 1, wherein said pattern rotation control circuit includes a first gain potentiometer connected to said X-axis component voltage, a first D.C. amplifier connected to said first potentiometer, a second D.C. amplifier and a first sine-cosine potentiometer connected to the output of said first D.C. amplifier, the output of said second D.C. amplifier also being connected to said first sine-cosine potentiometer, a second gain potentiometer connected to said Y-axis component voltage, a third D.C. amplifier connected to said second gain potentiometer, a fourth D.C. amplifier and a second sine-cosine potentiometer connected to the output of said third D.C. amplifier, the output of said fourth D.C. amplifier also being connected to said second sine-cosine potentiometer, a fifth D.C. amplifier and a sixth D.C. amplifier, and circuit means for cross-connecting the outputs of said first and second sine-cosine potentiometers to said fifth and sixth D.C. amplifiers, said first and second sine-cosine potentiometers being mechanically coupled together for mechanical rotation thereof, as desired, the outputs of said fifth and sixth D.C. amplifiers connected to said respective second inputs to said dual power amplifier, whereby said selected pattern is rotated the same number of degrees as said coupled sine-cosine potentiometers are rotated to effect said orientation of said selected pattern with said workpiece.

3. The system set forth in claim 2, wherein said improvement further includes a Data-Trak circuit for providing second selected X- and Y-axis component voltages representing a selected irregular shaped pattern for effecting the welding of workpieces in the same repetitive manner, and selector switch means for alternatively connecting, as desired, the output of said Data-Trak circuit and the output of said pattern generator to said rotation control circuit, whereby said welder is adapted to weld onto said workpiece a selected pattern from either of said Data-Trak circuit and said pattern generator as modified by said rotation control circuit when required to effect said orientation.

4. The system set forth in claim 2, wherein said improvement further includes a hand control Tracer circuit for providing third X- and Y-axis component voltages representing any desired irregular shaped pattern as a function of variable forces on a hand control of said Tracer circuit, and selector switch means for alternatively connecting, as desired, said second inputs of said dual power amplifier to the output of said pattern generator through said rotation control circuit and directly to the output of said Tracer circuit, whereby said welder is adapted to selectively weld onto said workpiece a selected pattern from said pattern generator as modified by said rotation control circuit when required to effect said orientation, and to weld an irregular shaped pattern as controlled by said Tracer circuit by a force on said hand control of said Tracer circuit.

5. The system set forth in claim 2, wherein said improvement further includes a Data-Trak circuit for providing second selected X- and Y-axis component voltages representing a selected irregular shaped pattern for effecting the welding of workpieces in the same repetitive manner, a hand control Tracer circuit for providing third X- and Y-axis component voltages representing any desired irregular shaped pattern as a function of variable forces on a hand control of said Tracer circuit, and selector switch means for selectively connecting, as desired, said second inputs of said dual power amplifier to the output of said pattern generator through said rotation control circuit, to the output of said Data-Trak circuit through said rotation control circuit, and directly to the output of said Tracer circuit, whereby said welder is adapted to weld onto said workpiece a selected pattern from either of said Data-Trak circuit and said pattern generator as modified by said rotation control circuit when required to effect said orientation, and, when desired, to weld onto said workpiece an irregular shaped pattern as controlled by said Tracer circuit by a force on said hand control of said Tracer circuit.

References Cited

UNITED STATES PATENTS

| | | | |
|---|---|---|---|
| 2,986,643 | 5/1961 | Brouillette | 250—202 |
| 3,004,166 | 10/1961 | Greene | 250—202 |
| 3,084,315 | 4/1963 | Coady-Farley et al. | 318—28 |
| 3,393,370 | 8/1965 | Bauer | 328—187 |

JOSEPH V. TRUHE, Primary Examiner

R. O'NEILL, Assistant Examiner

U.S. Cl. X.R.

328—187